US006582647B1

(12) United States Patent
Hall et al.

(10) Patent No.: US 6,582,647 B1
(45) Date of Patent: Jun. 24, 2003

(54) METHOD FOR HEAT TREATING PTC DEVICES

(75) Inventors: Tom J. Hall, Arlington Heights, IL (US); Michael J. Weber, Arlington Heights, IL (US)

(73) Assignee: Littelfuse, Inc., Des Plaines, IL (US)

( * ) Notice: Subject to any disclaimer, the term of this patent is extended or adjusted under 35 U.S.C. 154(b) by 0 days.

(21) Appl. No.: 09/408,645

(22) Filed: Sep. 30, 1999

Related U.S. Application Data

(60) Provisional application No. 60/102,602, filed on Oct. 1, 1998.

(51) Int. Cl.[7] .......................... B29C 71/00; B29C 71/02

(52) U.S. Cl. ....................................... 264/345; 264/340

(58) Field of Search ................................ 264/234, 340, 264/345, 347; 252/511, 512, 500, 510

(56) References Cited

U.S. PATENT DOCUMENTS

| | | | |
|---|---|---|---|
| 2,978,665 | A | 4/1961 | Vernet et al. |
| 3,241,026 | A | 3/1966 | Andrich |
| 3,243,753 | A | 3/1966 | Kohler |
| 3,351,882 | A | 11/1967 | Kohler et al. |
| 3,591,526 | A | 7/1971 | Kawashima et al. |
| 3,823,217 | A | 7/1974 | Kampe |
| 3,828,332 | A | 8/1974 | Rekai |
| 3,858,144 | A | 12/1974 | Bedard et al. |
| 4,124,747 | A | 11/1978 | Murer et al. |
| 4,169,816 | A | 10/1979 | Tsien |
| 4,177,376 | A | 12/1979 | Horsma et al. |
| 4,177,446 | A | 12/1979 | Diaz |
| 4,188,276 | A | 2/1980 | Lyons et al. |
| 4,223,209 | A | 9/1980 | Diaz |
| 4,237,441 | A | 12/1980 | van Konynenburg et al. |
| 4,238,812 | A | 12/1980 | Middleman et al. |
| 4,259,657 | A | 3/1981 | Ishikawa et al. |
| 4,272,471 | A | 6/1981 | Walker |
| 4,304,987 | A | 12/1981 | van Konynenburg |
| 4,318,220 | A | 3/1982 | Diaz |

(List continued on next page.)

FOREIGN PATENT DOCUMENTS

| | | | | |
|---|---|---|---|---|
| CA | 1254323 | | | 5/1989 |
| DE | 1253332 | | | 4/1965 |
| DE | 2626513 | | * | 12/1977 |
| DE | 209311 | A | * | 4/1984 |
| EP | 0 169 059 | A2 | | 1/1986 |
| EP | 0 229 286 | | | 7/1987 |
| EP | 0 460 790 | A1 | | 12/1991 |
| EP | 0 588 136 | A2 | | 3/1994 |
| EP | 0 731 475 | A2 | | 9/1996 |
| EP | 0 790 625 | A2 | | 8/1997 |
| EP | 0 827 160 | A1 | | 3/1998 |
| EP | 0 901 133 | A2 | | 3/1999 |
| GB | 541222 | | | 11/1941 |
| GB | 604695 | | | 7/1948 |
| GB | 1172718 | | | 12/1969 |
| GB | 1449261 | | | 9/1976 |
| GB | 1604735 | | | 12/1981 |
| JP | 50-33707 | | | 12/1972 |
| JP | 52-62680 | | | 5/1977 |
| JP | 53-104339 | | | 8/1978 |

(List continued on next page.)

OTHER PUBLICATIONS

Yoshio Sorimachi, Ichiro Tsubata and Noboru Nishizawa, The Transactions of the Institute of Electronics and Communications Engineers of Japan—Analysis of Static Self Heating Characteristics of PTC Thermistor Based on Carbon Black Graft Polymer, vol. J61–C, No. 12, pp. 767–774 (Dec. 25, 1978).

Ichiro Tsubata and Yoshio Sorimachi, Faculty of Engineering, Niigata University—PTC Characteristics and Components on Carbon Black Graft Polymer, pp. 31–38 (with translation).

Yoshio Sorimachi and Ichiro Tsubata, The Transactions of the Institute of Electronics and Communication Engineers of Japan—Characteristics of PTC Thermistor Based on Carbon Black Graft Polymer, vol. J60–C, No. 2, pp. 90–97 (Feb. 25, 1977).

Yoshio Sorimachi and Ichiro Tsubata, Electronics Parts and Materials, Niigata University—The Analysis of Current Falling Characteristics on C.G. (Carbon Black Graft Polymer)—PTC Thermistor, Shingaku Gihou, vol. 9, pp. 23–27 ED–75–35, 75–62 (1975) (with Translation).

B. Wartgotz and W.M. Alvino, Polymer Engineering and Science—Conductive Polyethylene Resins from Ethylene Copolymers and Conductive Carbon Black, pp. 63–70 (Jan., 1967).

Kazuyuki Ohe and Yoshihide Naito, Japanese Journal of Applied Physics—A New Resistor Having an Anomalously Large Positive Temperature Coefficient, vol. 10, No. 1, pp. 99–108 (Jan., 1971).

Ichiro Tsubata and Naomitsu Takashina, 10th Regional Conference on Carbon—Thermistor with Positive Temperature Coefficient Based on Graft Carbon, pp. 235–236 (1971).

(List continued on next page.)

*Primary Examiner*—Angela Ortiz
(74) *Attorney, Agent, or Firm*—Bell, Boyd & Lloyd LLC

(57) ABSTRACT

The present invention provides a method for heat treating a polymer PTC composition to increase the peak resistivity of the composition making it especially well suited for high voltage applications. A polymer PTC composition having a melting point temperature $T_{mp}$ is provided. The temperature of the polymer PTC composition is increased at a rate, $r_1$, to a temperature greater than $T_{mp}$. The temperature of polymer PTC composition is held at the temperature greater than $T_{mp}$ for a predetermined period of time. Then the temperature of the polymer PTC composition is decreased to a temperature less than $T_{mp}$ at a rate, $r_2$, wherein $r_2$ is greater than $r_1$.

16 Claims, 5 Drawing Sheets

U.S. PATENT DOCUMENTS

| | | | | |
|---|---|---|---|---|
| 4,327,351 | A | | 4/1982 | Walker |
| 4,329,726 | A | | 5/1982 | Middleman et al. |
| 4,330,703 | A | | 5/1982 | Horsma et al. |
| 4,330,704 | A | | 5/1982 | Jensen |
| 4,367,168 | A | | 1/1983 | Kelly |
| 4,383,942 | A | | 5/1983 | Davenport |
| 4,388,607 | A | | 6/1983 | Toy et al. |
| 4,413,301 | A | | 11/1983 | Middleman et al. |
| 4,426,546 | A | | 1/1984 | Hotta et al. |
| 4,426,633 | A | | 1/1984 | Taylor |
| 4,445,026 | A | | 4/1984 | Walker |
| 4,475,138 | A | | 10/1984 | Middleman et al. |
| 4,534,889 | A | | 8/1985 | van Konynenburg et al. |
| 4,548,740 | A | | 10/1985 | von Tomkewitsch et al. |
| 4,560,498 | A | | 12/1985 | Horsma et al. |
| 4,617,609 | A | | 10/1986 | Utner et al. |
| 4,685,025 | A | | 8/1987 | Carlomagno |
| 4,689,475 | A | | 8/1987 | Kleiner et al. |
| 4,724,417 | A | | 2/1988 | Au et al. |
| 4,732,701 | A | | 3/1988 | Nishii et al. |
| 4,749,623 | A | | 6/1988 | Endo et al. |
| 4,774,024 | A | | 9/1988 | Deep et al. |
| 4,775,778 | A | | 10/1988 | van Konynenburg et al. |
| 4,800,253 | A | | 1/1989 | Kleiner et al. |
| 4,801,785 | A | | 1/1989 | Chan et al. |
| 4,857,880 | A | | 8/1989 | Au et al. |
| 4,876,439 | A | | 10/1989 | Negahori |
| 4,878,038 | A | | 10/1989 | Tsai |
| 4,880,577 | A | | 11/1989 | Okita et al. |
| 4,882,466 | A | | 11/1989 | Friel |
| 4,884,163 | A | | 11/1989 | Deep et al. |
| 4,907,340 | A | | 3/1990 | Fang et al. |
| 4,910,389 | A | | 3/1990 | Sherman et al. |
| 4,924,074 | A | | 5/1990 | Fang et al. |
| 4,951,382 | A | | 8/1990 | Jacobs et al. |
| 4,955,267 | A | | 9/1990 | Jacobs et al. |
| 4,959,632 | A | | 9/1990 | Uchida |
| 4,966,729 | A | | 10/1990 | Carmona et al. |
| 4,967,176 | A | | 10/1990 | Horsma et al. |
| 4,971,726 | A | | 11/1990 | Maeno et al. |
| 4,973,934 | A | | 11/1990 | Saito et al. |
| 4,980,541 | A | | 12/1990 | Shafe et al. |
| 4,983,944 | A | | 1/1991 | Uchida et al. |
| 5,068,061 | A | | 11/1991 | Knobel et al. |
| 5,089,801 | A | | 2/1992 | Chan et al. |
| 5,106,538 | A | | 4/1992 | Barma et al. |
| 5,106,540 | A | | 4/1992 | Barma et al. |
| 5,136,365 | A | | 8/1992 | Pennisi et al. |
| 5,140,297 | A | | 8/1992 | Jacobs et al. |
| 5,142,263 | A | | 8/1992 | Childers et al. |
| 5,143,649 | A | | 9/1992 | Blackledge et al. |
| 5,171,774 | A | | 12/1992 | Ueno et al. |
| 5,174,924 | A | | 12/1992 | Yamada et al. |
| 5,189,092 | A | | 2/1993 | Koslow |
| 5,190,697 | A | | 3/1993 | Ohkita et al. |
| 5,195,013 | A | | 3/1993 | Jacobs et al. |
| 5,212,466 | A | | 5/1993 | Yamada et al. |
| 5,214,091 | A | | 5/1993 | Tanaka et al. |
| 5,227,946 | A | | 7/1993 | Jacobs et al. |
| 5,231,371 | A | | 7/1993 | Kobayashi |
| 5,241,741 | A | | 9/1993 | Sugaya |
| 5,247,276 | A | | 9/1993 | Yamazaki |
| 5,247,277 | A | | 9/1993 | Fang et al. |
| 5,250,226 | A | | 10/1993 | Oswal et al. |
| 5,250,228 | A | | 10/1993 | Baigrie et al. |
| 5,257,003 | A | | 10/1993 | Mahoney |
| 5,268,665 | A | | 12/1993 | Iwao |
| 5,280,263 | A | | 1/1994 | Sugaya |
| 5,281,845 | A | | 1/1994 | Wang et al. |
| 5,289,155 | A | | 2/1994 | Okumura et al. |
| 5,303,115 | A | | 4/1994 | Nayar et al. |
| 5,313,184 | A | | 5/1994 | Greuter et al. |
| 5,337,038 | A | | 8/1994 | Taniguchi et al. |
| 5,351,026 | A | | 9/1994 | Kanbara et al. |
| 5,351,390 | A | | 10/1994 | Yamada et al. |
| 5,358,793 | A | | 10/1994 | Hanada et al. |
| 5,374,379 | A | | 12/1994 | Tsubokawa et al. |
| 5,382,384 | A | | 1/1995 | Baigrie et al. |
| 5,382,938 | A | | 1/1995 | Hansson et al. |
| 5,399,295 | A | | 3/1995 | Gamble et al. |
| 5,412,865 | A | | 5/1995 | Takaoka et al. |
| 5,488,348 | A | | 1/1996 | Asida et al. |
| 5,493,266 | A | | 2/1996 | Sasaki et al. |
| 5,500,996 | A | | 3/1996 | Fritsch et al. |
| 5,543,705 | A | | 8/1996 | Uezono et al. |
| 5,554,679 | A | | 9/1996 | Cheng |
| 5,610,436 | A | | 3/1997 | Sponaugle et al. |
| 5,747,147 | A | | 5/1998 | Wartenberg et al. |
| 5,777,541 | A | | 7/1998 | Vekeman |
| 5,801,612 | A | | 9/1998 | Chandler et al. |
| 5,814,264 | A | * | 9/1998 | Cai et al. .................... 264/408 |
| 5,817,423 | A | | 10/1998 | Kajimaru et al. |
| 5,818,676 | A | | 10/1998 | Gronowicz, Jr. |
| 5,831,510 | A | | 11/1998 | Zhang et al. |
| 5,849,129 | A | | 12/1998 | Hogge et al. |
| 5,852,397 | A | | 12/1998 | Chan et al. |
| 5,864,281 | A | | 1/1999 | Zhang et al. |
| 5,874,885 | A | | 2/1999 | Chandler et al. |

FOREIGN PATENT DOCUMENTS

| | | | |
|---|---|---|---|
| JP | 58-81264 | | 5/1983 |
| JP | 58-81265 | | 5/1983 |
| JP | 58-162877 | | 9/1983 |
| JP | 58-162878 | | 9/1983 |
| JP | 60-196901 | | 10/1985 |
| JP | 62-79418 | | 4/1987 |
| JP | 62-79419 | | 4/1987 |
| JP | 62-181347 | | 8/1987 |
| JP | 63-85864 | | 4/1988 |
| JP | 63-146403 | * | 6/1988 |
| JP | 1-104334 | | 4/1989 |
| JP | 2-109226 | | 4/1990 |
| JP | 3-221613 | | 9/1991 |
| JP | 3-271330 | | 12/1991 |
| JP | 4-096202 | | 7/1992 |
| JP | 5-109502 | | 4/1993 |
| JP | 6-181102 | * | 6/1994 |
| JP | 6-124803 | | 8/1994 |
| JP | 60-298148 | | 10/1994 |
| JP | 7-094018 | | 4/1995 |
| JP | 7-161503 | | 6/1995 |
| JP | 9-199302 | | 7/1997 |
| WO | WO 93/14511 | | 7/1993 |
| WO | WO 94/01876 | | 1/1994 |
| WO | WO 95/08176 | | 3/1995 |
| WO | WO 95/31816 | | 11/1995 |
| WO | WO 95/33276 | | 12/1995 |
| WO | WO 95/34084 | | 12/1995 |
| WO | WO 98/12715 | | 3/1998 |
| WO | WO 98/29879 | | 7/1998 |
| WO | WO 98/34084 | | 8/1998 |
| WO | WO 99/03113 | | 1/1999 |

OTHER PUBLICATIONS

J. Meyer, Polymer Engineering and Science—Glass Transition Temperature as a Guide to Selection of Polymers Suitable for PTC Materials, vol. 13, No. 6, pp. 462–468 (Nov., 1973).

J. Meyer, Polymer Engineering and Science—Stability of Polymer Composites as Positive–Temperature–Coefficient Resistors, vol. 14, No. 10, pp. 706–716 (Oct., 1974).

Yoshio Sorimachi and Ichiro Tsubata, Shengakeekai Parts Material—Characteristics of PTC–Thermistor Based on Carbon Black Graft Polymer, vol. 9, Paper, No. UDC 621.316.825.2:678.744.32–13:661.666.4 (1974).

Carl Klason and Josef Kubat, Journal of Applied Polymer Science—Anomalous Behavior of Electrical Conductivity and Thermal Noise in Carbon Black–Containing Polymers at $T_g$ and $T_{m'}$, vol. 19, pp. 831–845 (1975).

M. Narkis, A. Ram and F. Flashner, Polymer Engineering and Science—Electrical Properties of Carbon Black Filled Polyethylene, vol. 18, No. 8 pp. 649–653 (Jun., 1978).

Andries Voet, Rubber Chemistry and Technology—Temperature Effect of Electrical Resistivity of Carbon Black Filled Polymers, vol. 54, pp. 42–50.

M. Narksi, A. Ram and Z. Stein, Journal of Applied Polymer Science—Effect of Crosslinking on Carbon Black/Polyethylene Switching Materials, vol. 25, pp. 1515–1518 (1980).

Frank A. Doljack, IEEE Transactions on Components Hybrids and Manufacturing—Technology, PolySwitch PTC Devices–A New Low–Resistance Conductive Polymer–Based PTC Device for Overcurrent Protection, vol. CHMT, No. 4, pp. 372–378 (Dec., 1981).

Keizo Miyasaka, et al., Journal of Materials Science—Electrical Conductivity of Carbon–Polymer Composites as Function of Carbon Content, vol. 17, pp. 1610–1616 (1982).

D.M. Bigg, Conductivity in Filled Thermoplastics—An Investigation of the Effect of Carbon Black Structure, Polymer Morphology, and Processing History on the Electrical Conductivity of Carbon–Black–Filled Thermoplastics, pp. 501–516.

J. Yacubowicz and M. Narkis, Polymer Engineering and Science—Dielectric Behavior of Carbon Black Filled Polymer Composites, vol. 26, No. 22, pp. 1568–1573 (Dec., 1986).

Mehrdad Ghofraniha and R. Salovey, Polymer Engineering and Science—Electrical Conductivity of Polymers Containing Carbon Black, vol. 28, No. 1, pp. 5863 (Mid–Jan., 1988).

J. Yacubowicz and M. Narkis, Polymer Engineering and Science—Electrical and Dielectric Properties of Segregated Carbon Black–Polyethylene Systems, vol. 30, No. 8, pp. 459–468 (Apr., 1990).

Biing–Lin Lee, Polymer Engineering and Science—Electrically Conductive Polymer Composites and Blends, vol. 32, No. 1, pp. 36–42 (Mid–Jan., 1992).

H.M. Al–Allak, A.W. Brinkman and J. Woods, Journal of Materials Science–I–V Characteristics of Carbon Black–Loaded Crystalline Polyethylene, vol. 28, pp. 117–120 (1993).

Hao Tang, et al., Journal of Applied Polymer Science—The Positive Temperature Coefficient Phenomenon of Vinyl Polymer/CB composites, vol. 48, pp. 1795–1800 (1993).

V.A. Ettel, P. Kalal, INCO Specialty Powder Products, Advances in Pasted Positive Electrode, (J. Roy Gordon Research Laboratory, Missisauga, Ont.), Presented at NiCad 94, Geneva, Switzerland, Sep. 19–23, 1994.

F. Gubbels, et al., Macromolecules—Design of Electrical Conductive Composites: Key Role of the Morphology on the Electrical Properties of Carbon Black Filled Polymer Blends, vol. 28 pp. 1559–1566 (1995).

Hao Tang, et al., Journal of Applied Polymer Science—Studies on the Electrical Conductivity of Carbon Black Filled Polymers, vol. 59, pp. 383–387 (1996).

* cited by examiner

METHOD FOR HEAT TREATING PTC DEVICES

DESCRIPTION

This application claims benefit of Prov. No. 60/102,602 filed Oct. 1, 1998.

TECHNICAL FIELD

The present invention relates generally to a process for heat treating conductive polymer compositions and electrical devices to improve their electrical properties.

BACKGROUND OF THE INVENTION

It is well known that the resistivity of many conductive materials change with temperature. Resistivity of a positive temperature coefficient ("PTC") material increases as the temperature of the material increases. Many crystalline polymers, made electrically conductive by dispersing conductive fillers therein, exhibit this PTC effect. These polymers generally include polyolefins such as polyethylene, polypropylene, polyvinylidene fluoride and ethylene/propylene copolymers. Certain doped ceramics such as barium titanate also exhibit PTC behavior.

At temperatures below a certain value, i.e., the critical or switching temperature, the PTC material exhibits a relatively low, constant resistivity. However, as the temperature of the PTC material increases beyond this point, the resistivity sharply increases with only a slight increase in temperature.

Electrical devices employing polymer and ceramic materials exhibiting PTC behavior have been used as overcurrent protection in electrical circuits. Under normal operating conditions in the electrical circuit, the resistance of the load and the PTC device is such that relatively little current flows through the PTC device. Thus, the temperature of the device due to $I^2R$ heating remains below the critical or switching temperature of the PTC device. The device is said to be in an equilibrium state (i.e., the rate at which heat is generated by $I^2R$ heating is equal to the rate at which the device is able to lose heat to its surroundings).

If the load is short circuited or the circuit experiences a power surge, the current flowing through the PTC device increases and the temperature of the PTC device (due to $I^2R$ heating) rises rapidly to its critical temperature. At this point, a great deal of power is dissipated in the PTC device and the PTC device becomes unstable (i.e., the rate at which the device generates heat is greater than the rate at which the device can lose heat to its surroundings). This power dissipation only occurs for a short period of time (i.e., a fraction of a second), however, because the increased power dissipation will raise the temperature of the PTC device to a value where the resistance of the PTC device has become so high that the current in the circuit is limited to a relatively low value. This new current value is enough to maintain the PTC device at a new, high temperature/high resistance equilibrium point, but will not damage the electrical circuit components. Thus, the PTC device acts as a form of a fuse, reducing the current flow through the short circuit load to a safe, relatively low value when the PTC device is heated to its critical temperature range. Upon interrupting the current in the circuit, or removing the condition responsible for the short circuit (or power surge), the PTC device will cool down below its critical temperature to its normal operating, low resistance state. The effect is a resettable, electrical circuit protection device.

Devices having higher resistance in the tripped state, i.e., at its new, high temperature/high resistance equilibrium point, are useful for high voltage applications. However, often during the manufacturing process of PTC devices the polymer composition is exposed to high temperatures, mechanical shear, thermal gradients and other influences which affect the electrical properties of the polymer composition, and particularly lower the peak resistance of the device rendering it unacceptable for higher voltage applications. Additionally, the resistance of the device can be adversely affected when the device is soldered to a PC board, once again rendering the device unacceptable for specific applications.

SUMMARY OF THE INVENTION

The present invention is directed to a method of heat treating a polymer PTC composition to raise the peak resistivity of the material. By raising the peak resistivity of the material, an electrical circuit protection device employing the material will exhibit an increased resistance in the trip or fault state. Devices heat treated according to the present invention are especially well suited for high voltage applications.

In a first aspect of the present invention there is provided a method for heat treating a polymer PTC composition having a melting point temperature $T_{mp}$. In the first step, the temperature of the polymer PTC composition is increased at a first rate, r1, to a temperature greater than $T_{mp}$. The temperature of the polymer PTC composition is held at this elevated temperature (greater than $T_{mp}$) for a predetermined period of time. The temperature of the polymer PTC composition is then decreased to a temperature less than $T_{mp}$ at a second rate, $r_2$, wherein $r_2$ is greater than $r_1$.

In a second aspect of the present invention there is provided a method for heat treating a polymer PTC composition having an initial peak resistivity, $R_{pi}$, and a melting point temperature, $T_{mp}$. The method comprises the steps of increasing the temperature of the polymer PTC composition at a first rate, $r_1$, to a temperature greater than $T_{mp}$. The temperature of the polymer PTC composition is held at this elevated temperature (greater than $T_{mp}$) for a predetermined period of time. Next, the temperature of the polymer PTC composition is decreased to a temperature less than $T_{mp}$ at a second rate, $r_2$, wherein $r_2$ is greater than $r_1$. After decreasing the temperature of the polymer PTC composition, the composition has a new peak resistivity, $R_{pn}$, which is at least $1.5\times R_{pi}$.

BRIEF DESCRIPTION OF THE DRAWINGS

A better understanding of the present invention will be had upon reference to the following detailed description and accompanying drawings.

DETAILED DESCRIPTION OF THE INVENTION

Figure 1:
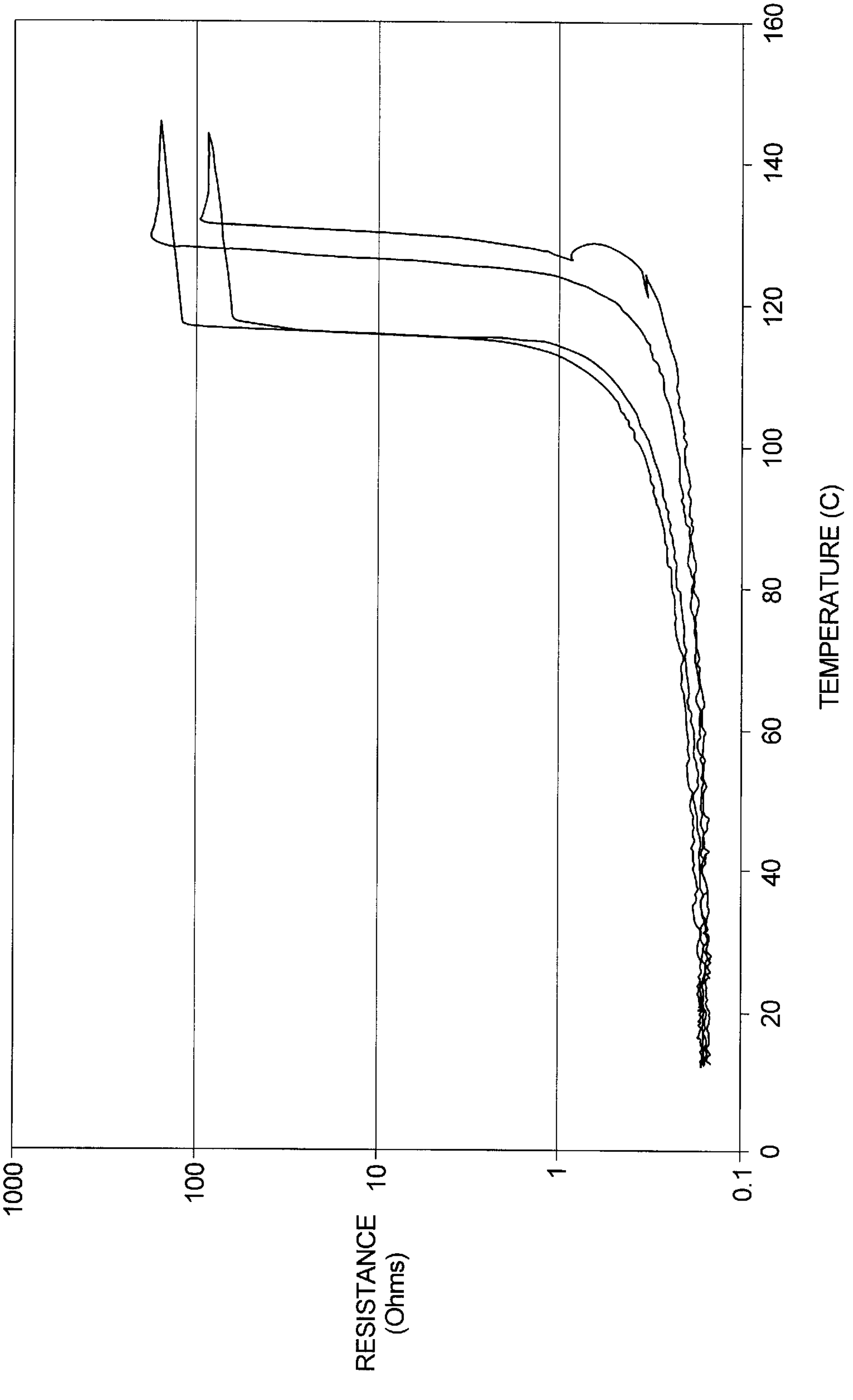
FIG. 1 is a graphical illustration of the peak resistance of an electrical device before and after a heat treatment according to the present invention.

While this invention is susceptible of embodiment in many different forms, there is shown in the drawings and will herein be described in detail preferred embodiments of the invention with the understanding that the present disclosure is to be considered as an exemplification of the principles of the invention.

It is known that the higher resistance a PTC circuit protection device has in the tripped or fault state, the higher voltages the device can withstand. This can be shown utilizing Ohm's Law and the equation for power dissipation, $P_d$.

Ohm's Law

R×I=V where R is the resistance of the device; I is the current flowing in the circuit; and V is the voltage of the power source.

Power Dissipation

The power dissipated in the device: $P_d$=I×V where I is the current flowing through the device and V is the voltage of the power source.

For a specific electrical application the power dissipation of the device will be a constant, k. Thus, I=k/V. Substituting I=k/V into Ohm's Law yields R×k=$V_2$. Accordingly, in the tripped state the higher the resistance of the device, the more voltage the device can withstand.

By changing the crystallinity of the polymer the morphology of a PTC composition changes. For example, by increasing the crystallinity, the morphology change increases the resistivity of the composition. It has been found that the morphology of a polymer PTC composition can be changed by slowly increasing the temperature of the composition above the melting point temperature $T_{mp}$ of the polymer. The temperature of the composition is then held at the increased temperature for a predetermined time, e.g., approximately 5 minutes, preferably 10–15 minutes, or even 20 minutes. Then the temperature of the composition is decreased, preferably back down to room temperature. The best results have been obtained when the temperature of the composition is decreased at a rate greater than the rate at which the temperature of the composition is increased.

In a preferred embodiment, the temperature of the composition is increased to approximately 5–10° C. above the melting point temperature of the polymer at a rate of approximately 0.5° C. per minute. The temperature remains at the elevated value for approximately 15 minutes. Then the temperature of the composition is decreased to room temperature at a rate at least twice the rate of the temperature increase, preferably at least four times the rate of the temperature increase, and more preferably at least eight times the rate of the temperature increase.

The method for heat treating of the present invention raises the peak resistivity of the polymer PTC composition, and thus the resistance of the electrical device in the tripped state. Accordingly, devices manufactured according to the present invention yield higher rated devices which can be used in higher voltage applications.

The heat treatment method of the present invention can be applied to polymer PTC compositions made according to any commonly known method, including those disclosed in U.S. Pat. No. 4,237,441, the disclosure of which is herein incorporated by reference. The heat treatment can also be applied to PTC compositions composed of different polymers, including co-polymers; e.g., polyolefins. Suitable polyolefins include: polyethylene, polyvinylidene fluoride, polypropylene, polybutadiene, polyethylene acrylates, ethyleneacrylic acid copolymers, ethylene/propylene copolymers, and modified polyolefins, i.e., a polyolefin having a carboxylic acid or a carboxylic acid derivative grafted thereto. Preferably the polymers of the compositions treated according to the present invention have a crystallinity of at least 20%, more preferably at least 50%, and especially at least 70%. It is important, however, that during the heat treatment the temperature of the polymer is raised above its melting point, thus altering the crystalline structure of the polymer and changing the morphology of the PTC composition.

Electrical circuit protection devices can be made according to any commonly known procedure; e.g., laminating metal foil electrodes to a PTC element as disclosed in U.S. Pat. Nos. 4,689,475 and 4,800,253, the disclosures of which are herein incorporated by reference. Examples of other circuit protection devices and methods for making them are disclosed in U.S. Pat. Nos. 5,814,264, 5,880,668, 5,884,391, 5,900,800, the disclosures of which are each incorporated herein by reference.

EXAMPLE 1

With reference to FIG. 1, the heat treatment method of the present invention was carried out on an electrical circuit protection device having a PTC element composed of a modified polyethylene (i.e., approximately 99% by weight polyethylene and 1% by weight maleic anhydride) and carbon black. Before the heat treatment the device had a peak resistance (i.e., the resistance of the device in the tripped state) of approximately 90 ohms. The device was treated by raising the temperature of the device by approximately 0.5° C. per minute to approximately 5–10° C. above the melting point temperature of the polymer PTC composition. The temperature was held at this point for approximately 15 minutes. Then the temperature was rapidly decreased at a rate of approximately 4.0° C. per minute to approximately room temperature. The peak resistance of the device was then measured and determined to be approximately 180 ohms.

EXAMPLE 2

Figure 2A:
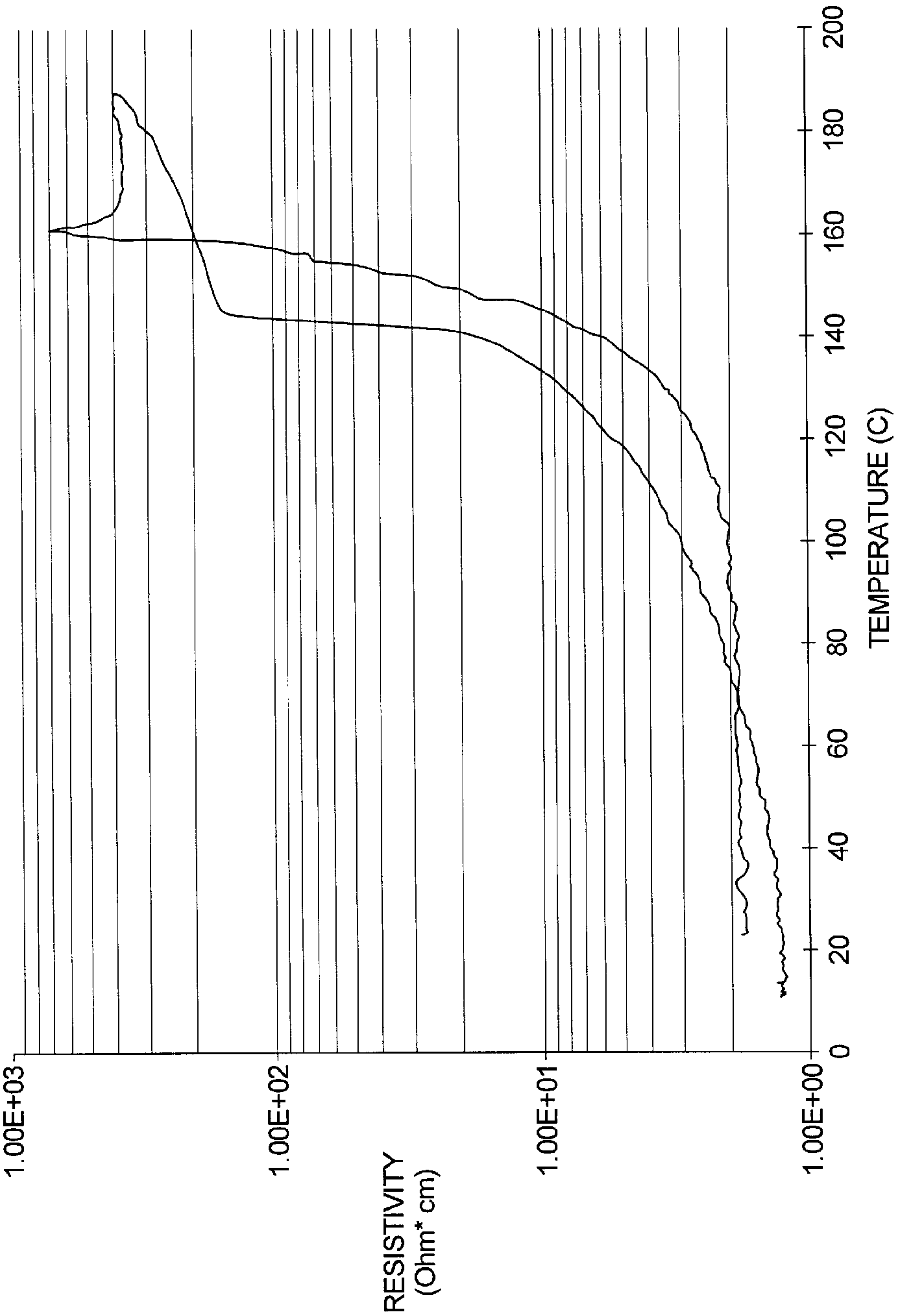
FIG. 2 A is a graphical illustration of the resistivity of a polymer PTC composition as a function of temperature prior to a heat treatment according to the present invention.
FIG. 2B is a graphical illustration of the resistivity of the polymer PTC composition graphically illustrated in FIG. 2A after a heat treatment according to the present invention.
Figure 2B:
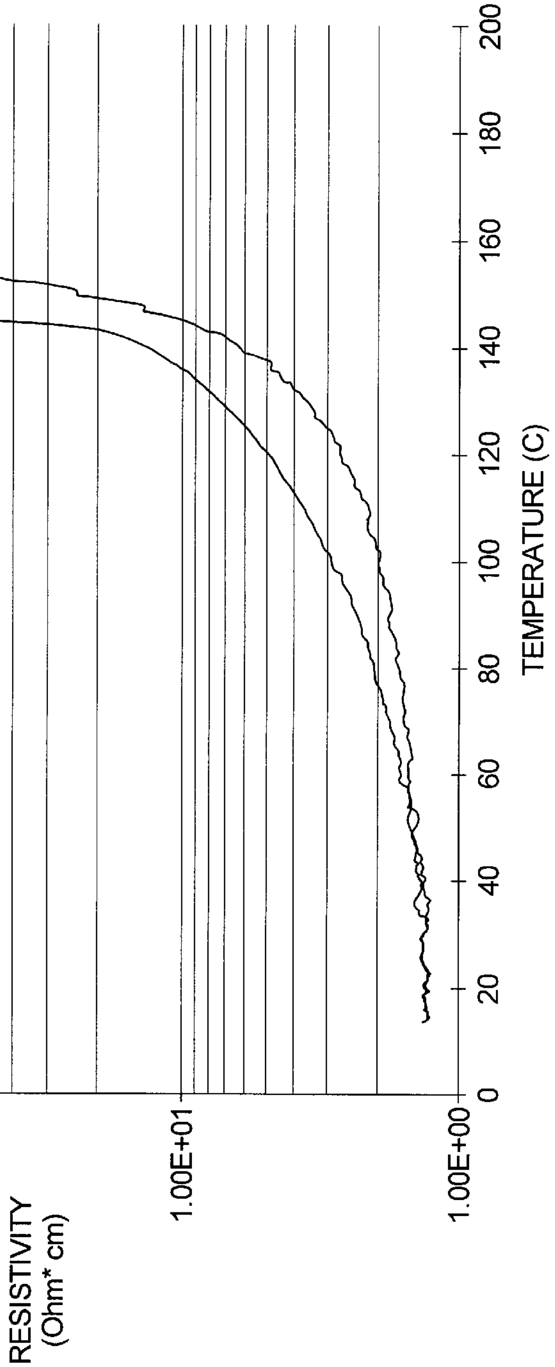

Referring now to FIGS. 2A and 2B, the same heat treatment method as described above in Example 1 was carried out on a circuit protection device having a polymer PTC composition composed of polyvinylidene fluoride and carbon black. As disclosed in FIG. 2A, prior to the heat treatment the peak resistance of the device was approximately 700 ohm. As disclosed in FIG. 2B, after the heat treatment the peak resistance of the same device was approximately 1,000 ohm.

EXAMPLE 3

Figure 3A:
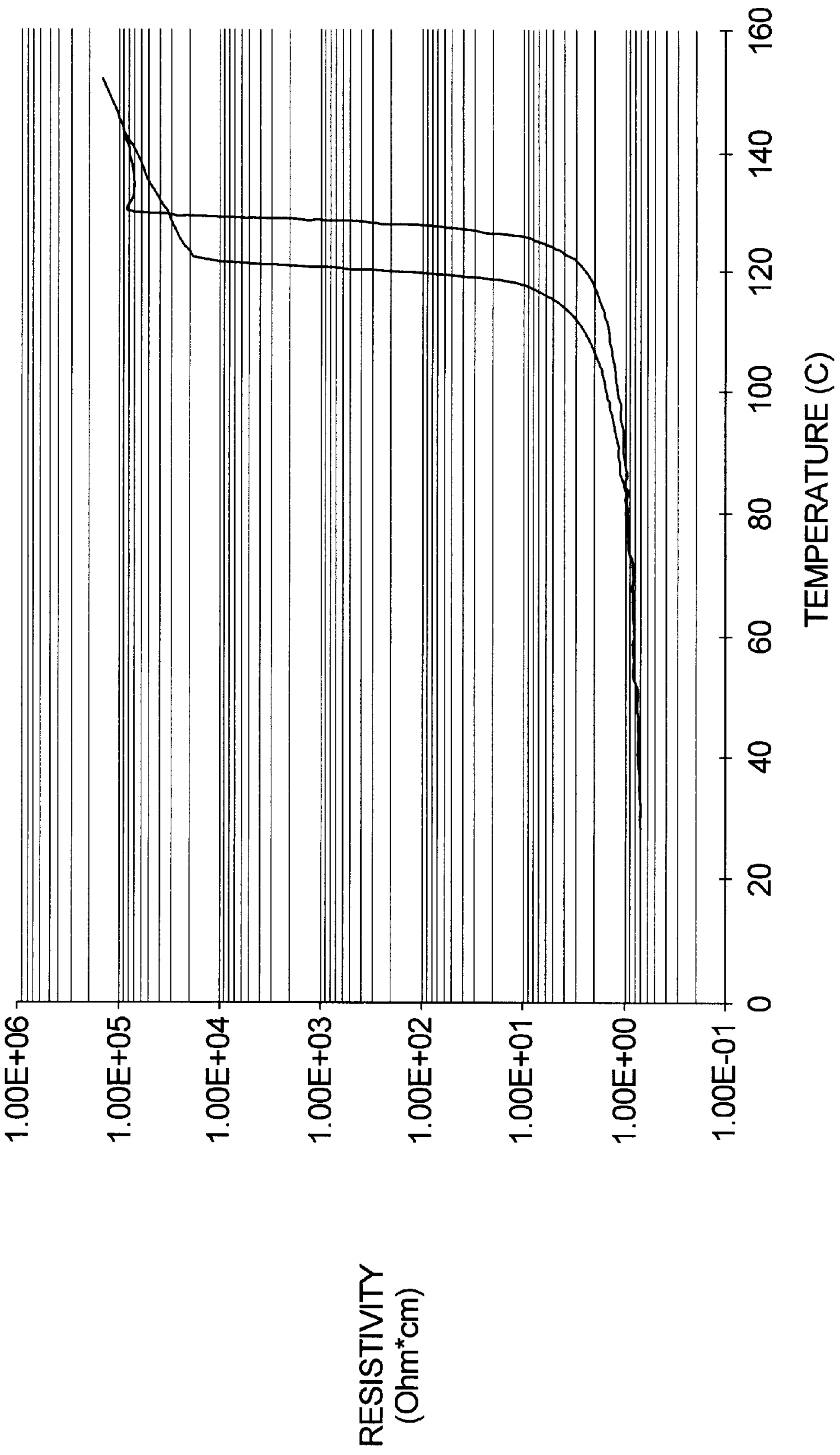
FIG. 3A is a graphical illustration of the resistivity of a polymer PTC composition as a function of temperature prior to a heat treatment according to the present invention.
Figure 3B:
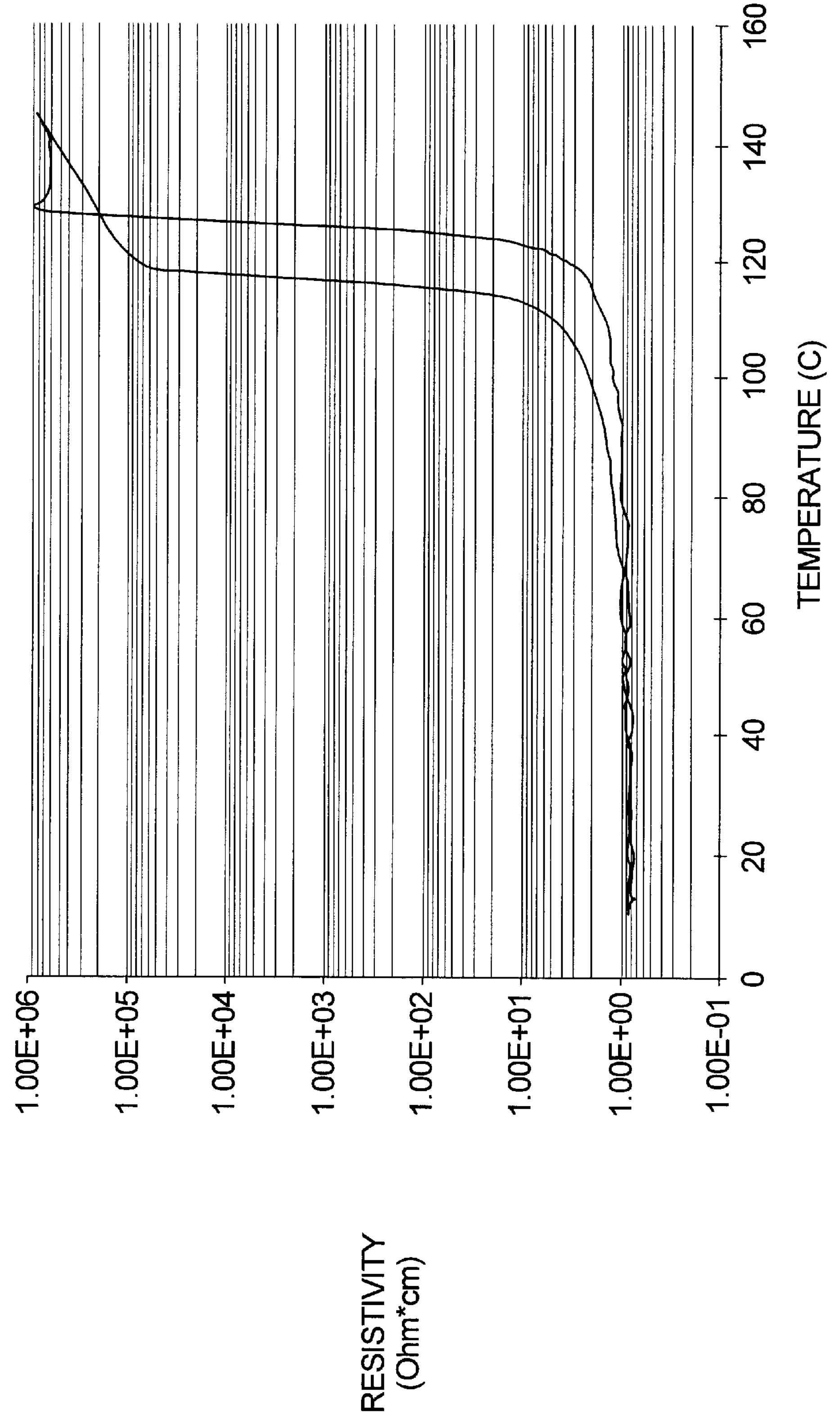
FIG. 3B is a graphical illustration of the resistivity of the polymer PTC composition graphically illustrated in FIG. 3A after a heat treatment according to the present invention.

Referring now to FIGS. 3A and 3B, the same heat treatment method as described above in Example 1 was carried out on a polymer PTC composition composed of polyethylene and carbon black. As disclosed in FIG. 3A, prior to the heat treatment the peak resistivity of the composition was approximately $9\times10^4$. As disclosed in FIG. 3B, after the heat treatment the peak resistivity of the composition was approximately $9\times10^5$. The heat treated composition experienced a ten-fold increase in peak resistivity which makes the composition more suited for higher voltage applications than the non-treated composition.

It should be understood by those having ordinary skill in the art that the present method for heat treating may be incorporated into the process for making a circuit protection device at different steps; e.g., the heat treatment method may be carried out solely on the polymer PTC composition, or on a completed electrical circuit protection device. Since a completed device will not be exposed to additional thermal or mechanical energy which may alter the crystalline structure of the polymer and hence the electrical characteristics of the device, the method of the present is preferably applied to a completed device.

What is claimed is:

1. A method for heat treating a polymer PTC composition, the method comprising the steps of:

providing a polymer PTC composition having a melting point temperature $T_{mp}$;

increasing the temperature of the polymer PTC composition at a first rate, $r_1$, to a temperature greater than $T_{mp}$;

holding the polymer PTC composition at the temperature greater than $T_{mp}$ for a predetermined period of time;

decreasing the temperature of the polymer PTC composition to a temperature less than $T_{mp}$ at a second rate, $r_2$, wherein $r_2$ is greater than $r_1$.

2. The method of claim 1, wherein the temperature less than $T_{mp}$ is room temperature.

3. The method of claim 1, wherein the temperature greater than $T_{mp}$ is at least 5–10° C. greater than $T_{mp}$.

4. The method of claim 1, wherein $r_2$ is at least two times greater than $r_1$.

5. The method of claim 1, wherein $r_2$ is at least four times greater than $r_1$.

6. The method of claim 1, wherein $r_2$ is at least eight times greater than $r_1$.

7. The method of claim 1, wherein the polymer PTC composition comprises a polyolefin having a crystallinity of at least 20%.

8. The method of claim 7, wherein the polyolefin has a crystallinity of at least 50%.

9. The method of claim 1, wherein the polymer PTC composition comprises polyethylene.

10. The method of claim 1, wherein the polymer PTC composition comprises polyvinylidene fluoride.

11. The method of claim 1, wherein the polymer PTC composition comprises a modified polyolefin.

12. A method for heat treating a polymer PTC composition having an initial peak resistivity, $R_{pi}$, and a melting point temperature, $T_{mp}$, the method comprising the steps of:

increasing the temperature of the polymer PTC composition at a first rate, $r_1$, to a temperature greater than $T_{mp}$;

holding the polymer PTC composition at the temperature greater than $T_{mp}$ for a predetermined period of time;

decreasing the temperature of the polymer PTC composition to a temperature less than $T_{mp}$ at a second rate, $r_2$, wherein $r_2$ is greater than $r_1$; and after decreasing the temperature of the polymer PTC composition, the composition has a new peak resistivity, $R_{pn}$, which is at least $1.5 \times R_{pi}$.

13. The method of claim 12, wherein $R_{pn}$ is at least $2 \times R_{pi}$.

14. The method of claim 12, wherein $R_{pn}$ is at least $10 \times R_{pi}$.

15. A method for heat treating an electrical circuit protection device having a PTC element and two electrodes, the PTC element being composed of a polymer PTC composition having a melting point temperature, $T_{mp}$, and an initial peak resistivity, $R_{pi}$, the method comprising the steps of:

increasing the temperature of the polymer PTC composition at a first rate, $r_1$, to a temperature greater than $T_{mp}$;

holding the polymer PTC composition at the temperature greater than $T_{mp}$ for a predetermined period of time;

decreasing the temperature of the polymer PTC composition to a temperature less than $T_{mp}$ at a second rate, $r_2$, wherein $r_2$ is greater than $r_1$ such that the polymer PTC composition has a new peak resistivity, $R_{pn}$, which is at least $1.5 \times R_{pi}$.

16. The method of claim 15, wherein the predetermined period of time is in a range of approximately 10–15 minutes.

* * * * *